United States Patent
Slayter et al.

(10) Patent No.: US 10,612,722 B2
(45) Date of Patent: Apr. 7, 2020

(54) THREADED LUBE RESTRICTOR FOR LOW FLOW APPLICATIONS

(71) Applicant: Hamilton Sundstrand Corporation, Charlotte, NC (US)

(72) Inventors: Matthew Allen Slayter, Rockford, IL (US); Michael R. Blewett, Stillman Valley, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 311 days.

(21) Appl. No.: 15/820,806

(22) Filed: Nov. 22, 2017

(65) Prior Publication Data
US 2019/0154199 A1    May 23, 2019

(51) Int. Cl.
*F16N 27/00* (2006.01)
*F16L 55/027* (2006.01)

(52) U.S. Cl.
CPC ...... *F16N 27/005* (2013.01); *F16L 55/02772* (2013.01); *F16N 27/00* (2013.01); *F16N 2270/26* (2013.01)

(58) Field of Classification Search
CPC .... A01G 25/023; Y02A 40/237; B01D 27/07; B01D 29/072; B01D 29/23
USPC ............................................................ 184/6
See application file for complete search history.

(56) References Cited

U.S. PATENT DOCUMENTS

| | | | | |
|---|---|---|---|---|
| 2,392,030 A | * | 1/1946 | Davis | F16N 27/005 137/504 |
| 2,597,775 A | * | 5/1952 | Brown | B65D 83/75 239/476 |
| 2,992,659 A | * | 7/1961 | Thomas | F16N 27/005 138/42 |
| 3,107,727 A | * | 10/1963 | Howard | E21B 43/08 166/381 |
| 3,729,142 A | * | 4/1973 | Rangel-Garza | A01G 25/023 239/542 |
| 3,887,138 A | * | 6/1975 | Gilead | A01G 25/02 239/542 |
| 3,897,009 A | * | 7/1975 | Rangel-Garza | A01G 25/023 239/542 |
| 3,998,244 A | * | 12/1976 | Bentley | A01G 25/023 138/43 |

(Continued)

FOREIGN PATENT DOCUMENTS

| | | |
|---|---|---|
| EP | 0255312 A1 | 2/1988 |
| FR | 2109384 A5 | 5/1972 |

OTHER PUBLICATIONS

European Search Report for Application No. 18205580.6-1007, dated Apr. 11, 2019, 7 Pages.

*Primary Examiner* — Henry Y Liu
(74) *Attorney, Agent, or Firm* — Cantor Colburn LLP

(57) ABSTRACT

A flow restrictor assembly includes a threaded element and a sleeve. The threaded element defines a plurality of threads that extend from a first threaded element end towards a second threaded element end. The sleeve has an inner sleeve surface that engages edges of a portion of the plurality of threads and extends between a first sleeve end and a second sleeve end. A lubrication flow path is defined by the portion of the plurality of threads and the inner sleeve surface and is arranged to create a pressure drop in a lubricant that flows through the lubrication flow path.

18 Claims, 1 Drawing Sheet

(56) References Cited

U.S. PATENT DOCUMENTS

| | | | | | |
|---|---|---|---|---|---|
| 4,653,695 | A | * | 3/1987 | Eckstein | A01G 25/023 239/542 |
| 4,832,836 | A | * | 5/1989 | Selsdon | B01D 27/07 123/196 R |
| 5,083,623 | A | * | 1/1992 | Barrington | E21B 17/07 166/242.7 |
| 5,465,693 | A | * | 11/1995 | Poole | F01M 9/10 123/196 CP |
| 6,250,806 | B1 | * | 6/2001 | Beshoory | E21B 4/003 175/107 |
| 6,290,397 | B1 | * | 9/2001 | Hashimoto | F16C 33/6651 384/462 |
| 8,628,032 | B2 | * | 1/2014 | Feith | A01G 25/023 239/542 |
| 8,827,562 | B2 | * | 9/2014 | Marchand | E21B 4/003 384/130 |
| 2014/0037235 | A1 | * | 2/2014 | Raby | F16C 17/08 384/371 |
| 2014/0261718 | A1 | * | 9/2014 | Albrecht | F16K 17/04 137/12 |
| 2017/0138433 | A1 | * | 5/2017 | Wang | E05F 3/20 |

\* cited by examiner

THREADED LUBE RESTRICTOR FOR LOW FLOW APPLICATIONS

BACKGROUND

Exemplary embodiments pertain to the art of lubrication systems having a threaded lube restrictor.

Some mechanical systems may have a high pressure, low flow requirement for regulating flow into the mechanical system. The flow is typically regulated by using different sized orifices that may become clogged by particles. In an attempt to reduce the risk of clogging, a screen may be provided to prevent material from blocking the orifice.

BRIEF DESCRIPTION

Disclosed is a lubrication system that includes a housing and a flow restrictor assembly. The housing defines a bore that extends along a first axis towards an end wall. The flow restrictor assembly extends into the bore along the first axis. The flow restrictor assembly includes a threaded element and a sleeve. The threaded element defines a plurality of threads that extend from a first threaded element end towards a second threaded element end. The sleeve is disposed about a portion of the plurality of threads. A lubrication flow path being defined between the portion of the plurality of threads and the sleeve.

In addition to one or more of the features described herein, the second threaded element end engages the end wall.

In addition to one or more of the features described herein, the sleeve includes an inner sleeve surface and an outer sleeve surface, each extending between a first sleeve end and a second sleeve end.

In addition to one or more of the features described herein, the inner sleeve surface engages edges of the portion of the plurality of threads.

In addition to one or more of the features described herein, a flow restrictor inlet is defined between a first thread and a first adjacent thread of the portion of the plurality of threads and the inner sleeve surface proximate the first sleeve end.

In addition to one or more of the features described herein, a flow restrictor outlet is defined between a second thread and a second adjacent thread of the portion of the plurality of threads and the inner sleeve surface proximate the second sleeve end.

In addition to one or more of the features described herein, the lubrication flow path is fluidly connected to and extends between the flow restrictor inlet and the flow restrictor outlet.

In addition to one or more of the features described herein, the housing defines a lubrication inlet and a lubrication outlet that is spaced apart from the lubrication inlet.

In addition to one or more of the features described herein, the lubrication inlet is proximately aligned with and is fluidly connected to the flow restrictor inlet.

In addition to one or more of the features described herein, the lubrication outlet is proximately aligned with and fluidly connected to the flow restrictor outlet.

In addition to one or more of the features described herein, a lubricant flows through the lubrication inlet, into the flow restrictor inlet, through the lubrication flow path, exits the flow restrictor outlet, and into the lubrication outlet.

In addition to one or more of the features described herein, the bore defines a threaded region that extends between the end wall and the lubrication outlet.

In addition to one or more of the features described herein, the outer sleeve surface engages the bore.

In addition to one or more of the features described herein, the sleeve is disposed between the lubrication inlet and the lubrication outlet.

Also disclosed is a flow restrictor assembly for a lubrication system. The flow restrictor assembly includes a threaded element and a sleeve. The threaded element defines a plurality of threads that extend from a first threaded element end towards a second threaded element end. The sleeve has an inner sleeve surface that engages edges of a portion of the plurality of threads and extends between a first sleeve end and a second sleeve end. A lubrication flow path is defined by the portion of the plurality of threads and the inner sleeve surface.

In addition to one or more of the features described herein, a flow restrictor inlet is defined between a first thread and a first adjacent thread of the portion of the plurality of threads and the inner sleeve surface proximate the first sleeve end.

In addition to one or more of the features described herein, a flow restrictor outlet is defined by a second thread and a second adjacent thread of the portion of the plurality of threads and the inner sleeve surface proximate the second sleeve end.

In addition to one or more of the features described herein, the lubrication flow path extends between and is fluidly connected to the flow restrictor inlet and the flow restrictor outlet.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
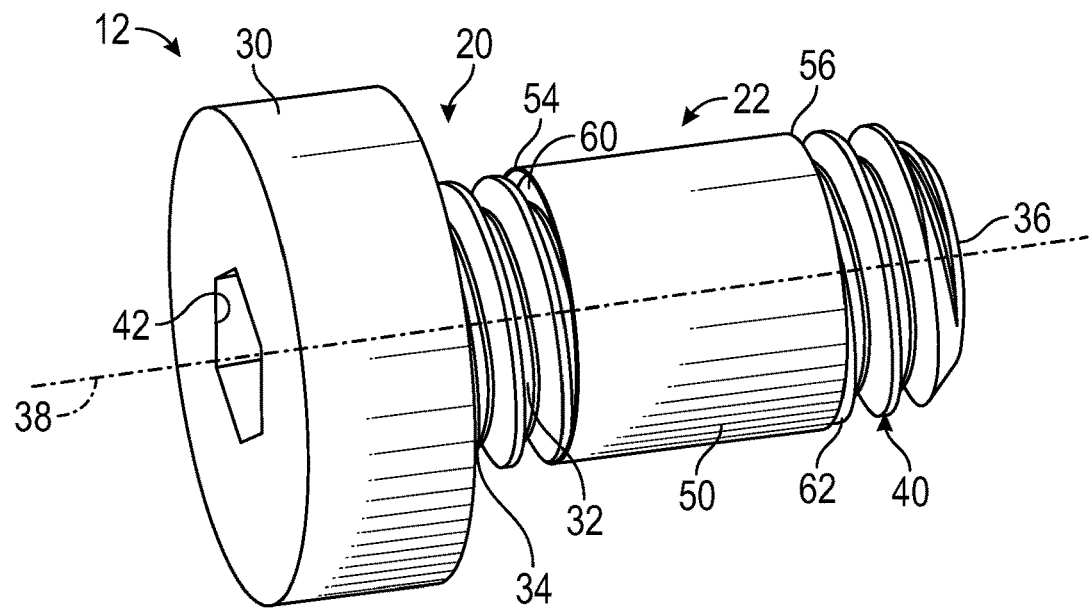
FIG. 1 is a perspective view of a flow restrictor assembly for a lubrication system.
Figure 2:
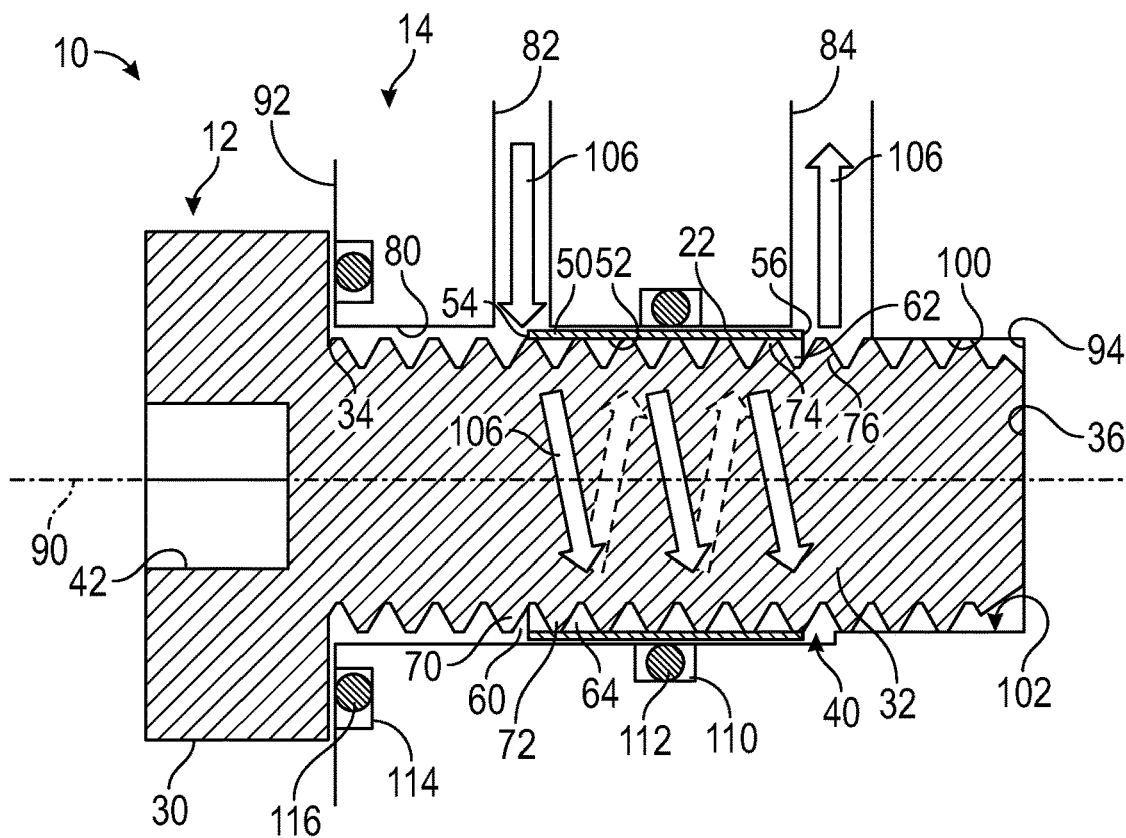
FIG. 2 is a partial cross-sectional view of the lubrication system having the flow restrictor assembly installed.

Referring to FIGS. 1 and 2, a lubrication system 10 is arranged to feed a fluid from a high pressure source to a component at a low flow rate. The lubrication system 10 includes a flow restrictor assembly 12 and a housing 14.

Referring to FIG. 1, the flow restrictor assembly 12 is arranged to create a pressure drop in the fluid such that the high pressure fluid is delivered to the component at the low flow rate. The flow restrictor assembly 12 includes a threaded element 20 and a sleeve 22 that is operatively connected to the threaded element 20.

The threaded element 20 may be a fastener such as a bolt having a head 30 and a shank or body 32 extending from the head 30 between a first threaded element end 34 and a second threaded element end 36 along a threaded element axis 38. The body 32 of the threaded element 20 defines a plurality of threads 40 that extend between the first threaded element end 34 and the second threaded element end 36.

As illustrated in FIGS. 1 and 2, the head 30 defines a socket 42 that extends from an end of the head 30 towards the body 32, however the head 30 may be configured as a hex head, socket head, pointed head, or the like.

Referring to FIGS. 1 and 2, the sleeve 22 is disposed about a portion of the plurality of threads 40 such that the sleeve 22 is disposed between the first threaded element end 34 and the second threaded element end 36. The sleeve 22 is arranged to engage edges or crests of the portion of the plurality of threads 40 and is spaced apart from roots of the portion of the plurality of threads 40. In at least one embodiment, the sleeve 22 does not engage sides or flanks of the portion of the plurality of threads 40.

The sleeve 22 may be a thin sheet metal sleeve that is attached to the edges of the portion of the plurality of threads 40. The sleeve 22 may be installed on to the threaded element 20 by heat shrinking the sleeve 22 onto the edges of the portion of the plurality of threads 40.

The sleeve 22 includes an inner sleeve surface 50 and an outer sleeve surface 52. Each of the inner sleeve surface 50 and the outer sleeve surface 52 extends between a first sleeve end 54 and a second sleeve end 56. The inner sleeve surface 50 engages edges of the portion of the plurality of threads 40. The inner sleeve surface 50 is spaced apart from flanks or roots of the portion of the plurality of threads 40.

A flow restrictor inlet 60, a flow restrictor outlet 62, and a lubrication flow path 64 are defined by the sleeve 22 and the portion of the plurality of threads 40. The flow restrictor inlet 60 is defined between a first thread 70 and a first adjacent thread 72 of the portion of the plurality of threads 40 and the inner sleeve surface 50 proximate the first sleeve end 54. The flow restrictor outlet 62 is defined between a second thread 74 and a second adjacent thread 76 of the portion of the plurality of threads 40 and the inner sleeve surface 50 proximate the second sleeve end 56.

The lubrication flow path 64 is defined between threads of the portion of the plurality of threads 40 and the inner sleeve surface 50. The lubrication flow path 64 extends between and is fluidly connected to the flow restrictor inlet 60 and the flow restrictor outlet 62, such that a lubricant may flow between threads of the portion of the plurality of threads 40 and the inner sleeve surface 50.

A length of the lubrication flow path 64 may be adjusted by adjusting a total length of the sleeve 22. Changes in the length of the lubrication flow path 64 may affect the pressure drop and flow rate of a lubricant that flows through the lubrication flow path 64. Furthermore, the size of the threads of the plurality of threads 40 may eliminate the need for a screen for the flow restrictor assembly 12.

The housing 14 is arranged to receive the flow restrictor assembly 12. The housing 14 defines a first bore 80, a lubrication inlet 82, and a lubrication outlet 84.

The first bore 80 extends along a first axis 90 from an end face 92 towards an end wall 94. In at least one embodiment, a second bore 100 extends from the first bore 80 along the first axis 90 to the end wall 94. The second bore 100 defines a threaded region 102 that extends between the end wall 94 and the lubrication outlet 84.

The lubrication inlet 82 extends along an axis that is disposed transverse to the first axis 90. The lubrication inlet 82 extends into the first bore 80. The lubrication inlet 82 is proximately aligned with and is fluidly connected to the flow restrictor inlet 60. The lubrication inlet 82 is arranged to provide a lubricant to the flow restrictor inlet 60.

The lubrication outlet 84 extends along an axis that is disposed transverse to the first axis 90. The lubrication outlet 84 is spaced apart from the lubrication inlet 82 and extends into at least one of the first bore 80 and/or the second bore 100. The lubrication outlet 84 is proximately aligned with and is fluidly connected to the flow restrictor outlet 62. The lubrication outlet 84 is arranged to provide the lubricant to the component.

The flow restrictor assembly 12 extends into the first bore 80 and the second bore 100 along the first axis 90 such that the threaded element axis 38 is disposed substantially parallel to the first axis 90. A portion of the plurality of threads 40 of the threaded element 20 proximate the first threaded element end 34 are spaced apart from the first bore 80. A portion of the plurality of threads 40 of the threaded element 20 proximate the second threaded element end 36 engage threads of the threaded region 102 of the second bore 100. The second threaded element end 36 engages the end wall 94 of the housing 14 to define a dead head.

The sleeve 22 is disposed between the lubrication inlet 82 and the lubrication outlet 84 of the housing 14. The outer sleeve surface 52 engages the first bore 80 of the housing 14. In such an arrangement, a lubricant 106 flows through the lubrication inlet 82 and into the flow restrictor inlet 60. The lubricant 106 may then flow through the lubrication flow path 64 and then exit through the flow restrictor outlet 62 and into the lubrication outlet 84 at the desired flow rate or pressure to the component.

In at least one embodiment, the housing 14 defines a first sealing recess 110 that receives a first sealing element 112. The first sealing recess 110 is disposed between the lubrication inlet 82 and the lubrication outlet 84. The first sealing element 112 is disposed about and may engage the outer sleeve surface 52.

In at least one embodiment, the housing 14 defines a second sealing recess 114 that receives a second sealing element 116. The second sealing recess 114 extends from the end face 92 towards the end wall 94. The second sealing element 116 may engage the head 30 of the threaded element 20.

The flow restrictor assembly 12 acts as a flow regulating device to regulate a fluid flow into a component. The threads of the threaded element 20 and the sleeve 22 define a flow path that creates a pressure drop to deliver a fluid flow to the component at a desired pressure and flow rate.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A lubrication system, comprising:
   a housing defining a bore that extends along a first axis towards an end wall; and
   a flow restrictor assembly that extends into the bore along the first axis, comprising:
      a threaded element defining a plurality of threads that extend from a first threaded element end towards a second threaded element end, and
      a sleeve disposed about a portion of the plurality of threads, a lubrication flow path being defined between the portion of the plurality of threads and the sleeve.

2. The lubrication system of claim 1, wherein the second threaded element end engages the end wall.

3. The lubrication system of claim 1, wherein the sleeve includes an inner sleeve surface and an outer sleeve surface, each extending between a first sleeve end and a second sleeve end.

4. The lubrication system of claim 3, wherein the inner sleeve surface engages edges of the portion of the plurality of threads.

5. The lubrication system of claim 3, wherein a flow restrictor inlet is defined between a first thread and a first adjacent thread of the portion of the plurality of threads and the inner sleeve surface proximate the first sleeve end.

6. The lubrication system of claim 5, wherein a flow restrictor outlet is defined between a second thread and a second adjacent thread of the portion of the plurality of threads and the inner sleeve surface proximate the second sleeve end.

7. The lubrication system of claim 6, wherein the lubrication flow path is fluidly connected to and extends between the flow restrictor inlet and the flow restrictor outlet.

8. The lubrication system of claim 7, wherein the housing defines a lubrication inlet and a lubrication outlet that is spaced apart from the lubrication inlet.

9. The lubrication system of claim 8, wherein the lubrication inlet is proximately aligned with and is fluidly connected to the flow restrictor inlet.

10. The lubrication system of claim 8, wherein the lubrication outlet is proximately aligned with and fluidly connected to the flow restrictor outlet.

11. The lubrication system of claim 8, wherein a lubricant flows through the lubrication inlet, into the flow restrictor inlet, through the lubrication flow path, exits the flow restrictor outlet, and into the lubrication outlet.

12. The lubrication system of claim 8, wherein the bore defines a threaded region that extends between the end wall and the lubrication outlet.

13. The lubrication system of claim 8, wherein the outer sleeve surface engages the bore.

14. The lubrication system of claim 8, wherein the sleeve is disposed between the lubrication inlet and the lubrication outlet.

15. A flow restrictor assembly for a lubrication system, comprising:
   a threaded element defining a plurality of threads that extend from a first threaded element end towards a second threaded element end, and
   a sleeve having an inner sleeve surface that engages edges of a portion of the plurality of threads and extends between a first sleeve end and a second sleeve end, a lubrication flow path is defined by the portion of the plurality of threads and the inner sleeve surface.

16. The flow restrictor assembly of claim 15, wherein a flow restrictor inlet is defined between a first thread and a first adjacent thread of the portion of the plurality of threads and the inner sleeve surface proximate the first sleeve end.

17. The flow restrictor assembly of claim 16, wherein a flow restrictor outlet is defined by a second thread and a second adjacent thread of the portion of the plurality of threads and the inner sleeve surface proximate the second sleeve end.

18. The flow restrictor assembly of claim 17, wherein the lubrication flow path extends between and is fluidly connected to the flow restrictor inlet and the flow restrictor outlet.

* * * * *